US006657922B2

(12) United States Patent
Sato

(10) Patent No.: US 6,657,922 B2
(45) Date of Patent: Dec. 2, 2003

(54) ELECTRONIC WATCH

(75) Inventor: Junichi Sato, Hachioji (JP)

(73) Assignee: Casio Computer Co., Ltd., Tokyo (JP)

(*) Notice: Subject to any disclaimer, the term of this patent is extended or adjusted under 35 U.S.C. 154(b) by 247 days.

(21) Appl. No.: 09/961,857

(22) Filed: Sep. 24, 2001

(65) Prior Publication Data

US 2002/0044501 A1 Apr. 18, 2002

(30) Foreign Application Priority Data

Sep. 26, 2000 (JP) ....................................... 2000-292151

(51) Int. Cl.$^{7}$ ........................ G04B 47/00; G04B 37/00; H04B 1/08

(52) U.S. Cl. ......................... 368/10; 368/281; 455/344; 455/351

(58) Field of Search ................................ 368/9, 10, 13, 368/88, 276, 281; 455/344–351, 556

(56) References Cited

U.S. PATENT DOCUMENTS 4,884,252 A * 11/1989 Teodoridis et al. ........... 368/10
5,559,760 A * 9/1996 Schneider .................... 368/10
6,412,976 B1 * 7/2002 Dechery et al. ............ 368/281
6,459,890 B1 * 10/2002 Kim ........................... 455/351

* cited by examiner

*Primary Examiner*—Vit Miska
(74) *Attorney, Agent, or Firm*—Frishauf, Holtz, Goodman & Chick, P.C.

(57) ABSTRACT

An electronic watch comprising: a watch case with a containing concavity which is formed in a peripheral portion thereof; an antenna contained in the containing concavity; a covering member mounted to the containing concavity, to cover the antenna; and a casing member provided with a supporting member which is attached to a periphery of the watch case to hold the covering member, covering at least a portion of the covering member. The supporting member undertakes a portion of the impact caused by dropping or the like to some extent, and accordingly, the covering member is protected by the supporting member so that the welding portion of the covering member is not cracked nor destroyed.

12 Claims, 7 Drawing Sheets

ELECTRONIC WATCH

BACKGROUND OF THE INVENTION

1. Field of the Invention

The present invention relates to an electronic watch having a built-in antenna.

2. Description of Related Art

As a type of an electronic watch, a radio wave watch with a built-in antenna is known. This type of watch has a watch case 1 made of a plastic, as shown in FIG. 6. The watch case 1 has two band connecting potions 2 which are provided at positions in the twelve o'clock side and the six o'clock side, although only that of the twelve o'clock side is shown in this figure. In the band connecting potion 2 in the twelve o'clock side, a containing concavity 3 is formed so as to open upwardly. In the containing concavity 3, an antenna 4 is contained. The antenna 4 is a bar antenna which comprises an iron core and a coil wounded around the core. Around the entirety of the periphery of the antenna 4, a cushion member 6 made of rubber sheet or the like is wounded. The upper portion of the containing concavity 3 is closed by a covering member 5 for covering the antenna 4. The covering member 5 comprises a plastic panel. The entirety of the periphery of the covering member 5 is welded to the watch case 1 around the upper portion of the containing concavity 3 by a welding method, e.g., a ultrasonic welding or the like.

At the central portion of the upper surface of the watch case 1, a watch glass 8 is provided to attach to the watch case by welding. On the periphery of the upper surface of the watch case 1, a bezel 7 is installed at a position between the covering member 5 and the watch glass 8. Inside the watch case 1, a watch module 9 is installed. The watch module 9 has at least one of the analog function and the digital function. The watch module 9 is electrically connected to the antenna 4 which is contained in the containing concavity 3. On the lower surface of the watch case 1, a case back 10 is attached through a waterproof ring 10*a*.

However, the electronic watch with such a structure has the following problems.

That is, in such an electronic watch, the whole surface of the covering member 5 which covers the antenna 4 is exposed outside. When such an electronic watch is dropped by accident in the state that the side of the watch glass 8 takes a lower position, the electronic watch rotates so that the antenna 4 takes a lower position because of the large weight of the antenna. As a result, the outer surface of the covering member 5 comes into collision with a floor or the like, and the welding portion of the covering member 5 receives a direct impact from the floor or the like to be cracked or destroyed.

The electronic watch having such a structure has also following another problem.

That is, the electronic watch requires to wound a cushion member 6 around the antenna 4 in order to protect the antenna 4 from such an impact. When wounding the cushion member 6 around the antenna 4, the size of the antenna 4 comes to be larger, and as a result, the entirety of the watch must be large-sized.

SUMMARY OF THE INVENTION

An object of the invention is to provide an electronic watch having an antenna and a covering member for covering the antenna, in which the covering member is hard to be cracked or destroyed by an impact caused by dropping or the like.

In order to solve the above-described problem, in accordance with an aspect of the present invention, the electronic watch comprises: a watch case with a containing concavity which is formed in a peripheral portion thereof; an antenna contained in the containing concavity; a covering member fixed to the watch case, for covering the containing concavity containing the antenna; and a casing member provided with a supporting member which is attached to a periphery of the watch case to hold down the covering member, covering at least a portion of the covering member.

According to the invention, because at least a portion of the covering member which is fixed to the watch case, for covering the containing concavity containing the antenna is covered and held by a supporting member which is attached to a periphery of the watch case, it is possible to undertake a part of the impact caused by dropping or the like, by the supporting member. Accordingly, it is possible to protect the covering member from cracking or destruction caused by the impact of dropping or the like.

In this case, it is preferable to provide a cushion member between the covering member and the supporting member.

According to the electronic watch having such a structure, it is possible to weaken the impact caused by dropping or the like and accordingly to protect the covering member and antenna contained in the containing concavity from the impact caused by dropping and the like. Further, because it is unnecessary to wound a cushion member around the antenna which is required for the conventional technique, the size of the whole antenna is not required to be large. As a result, it is possible to miniaturize the whole electronic watch.

PREFERRED EMBODIMENT OF THE INVENTION

Figure 6:
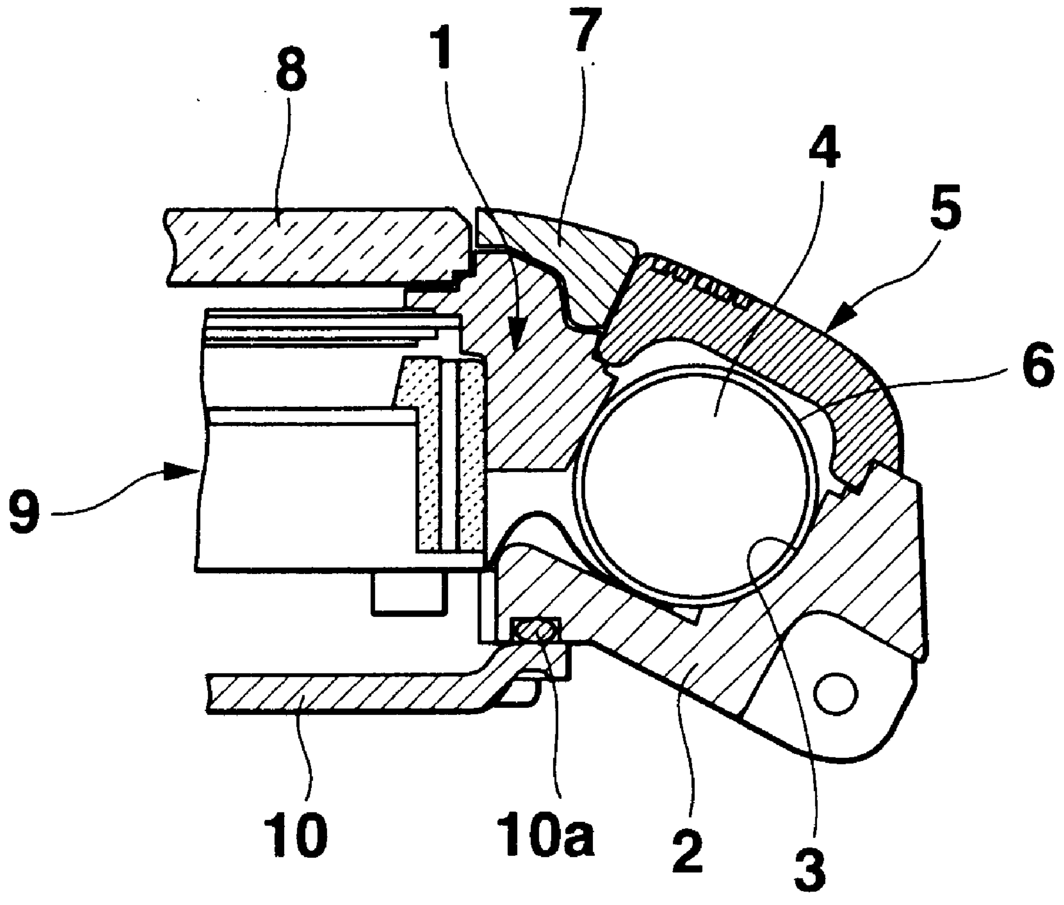
FIG. 6 is an enlarged sectional view showing the main portion of a conventional electronic watch.
Figure 7:
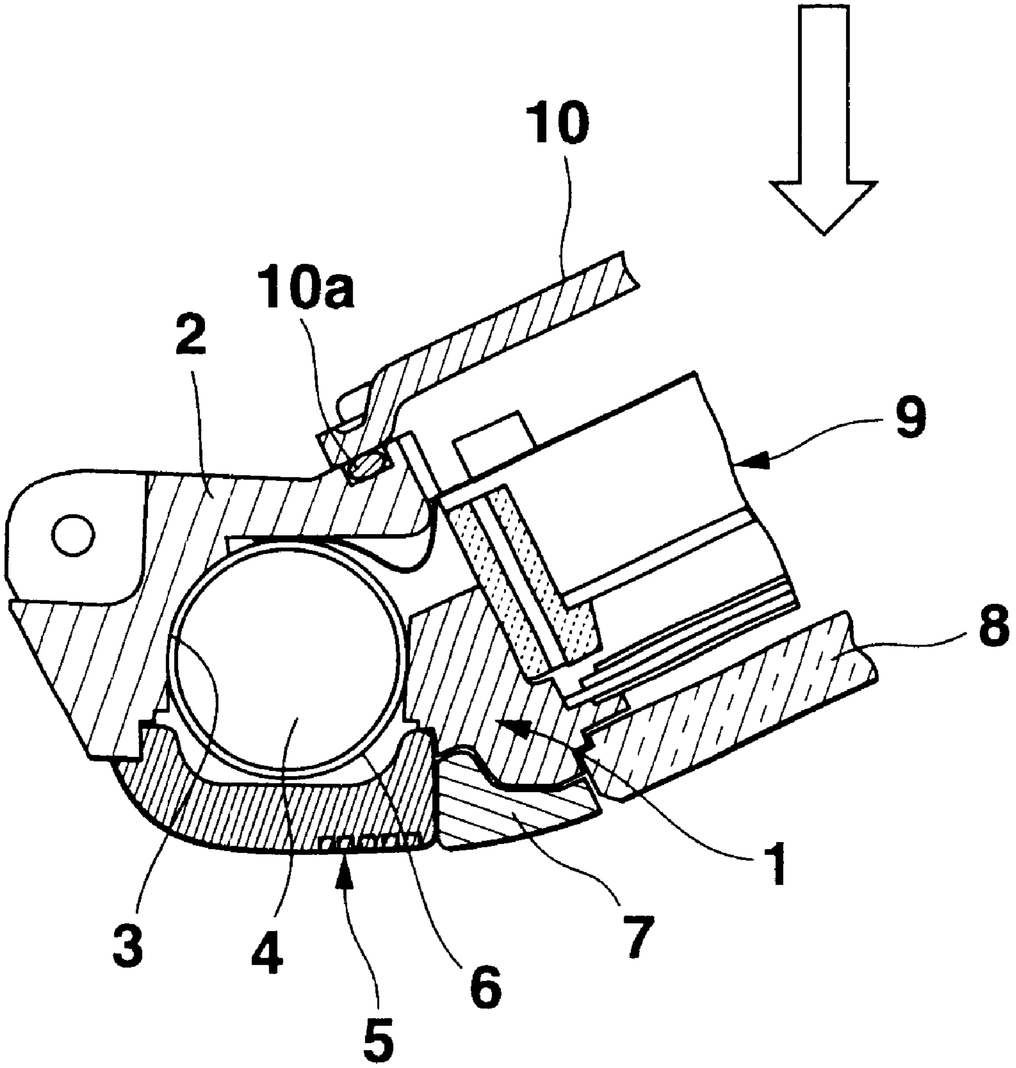
FIG. 7 is an enlarged sectional view showing the state of the main portion of the conventional watch shown in FIG. 6 dropping down.

Hereinbelow, a first embodiment of the electronic watch according to the invention will be described with reference to FIGS. 1 to 4. In these figures, the same numbers are attached to structural members, elements or the like corresponding to those of the conventional technique shown in FIGS. 6 and 7.

The electronic watch according to the invention comprises a watch case 1 made of a plastic. The watch case 1 comprises a pair of band connecting portions 2 which are disposed at opposed positions in six o'clock side and twelve o'clock side thereof. As shown FIGS. 1 and 2, at the position in the band connecting portion 2 in the twelve o'clock side, an antenna attachment portion 11 is provided as a body so that the top end thereof is projected a little in the nine o'clock direction, that is, left direction in FIG. 2. In the antenna attachment portion 11, a containing concavity 12 for containing an antenna 4 therein is formed in a peripheral portion thereof so that the containing concavity 12 is opened in the upper side. The antenna 4 is adhered to the bottom surface of the antenna attachment portion 11 in the containing concavity 12 by using a pressure sensitive adhesive double coated tape 13. To the upper portion of the antenna attachment portion 11, a covering member 14 for covering the antenna 4 is fixed so as to form the containing concavity 12 together with the antenna attachment portion 11. The covering member 14 is also made of a plastic panel, like the conventional example. The covering member 14 comprises an upper wall portion and a side wall portion, to form a space which is opened in the lower side. The upper wall portion of the covering member 14 has a conical shaped section and a thickness larger than that of the side wall portion. The entirety of the periphery of the covering member 14 is welded to the antenna attachment portion 11 around the containing concavity 12 by ultrasonic welding or the like.

Figure 1:
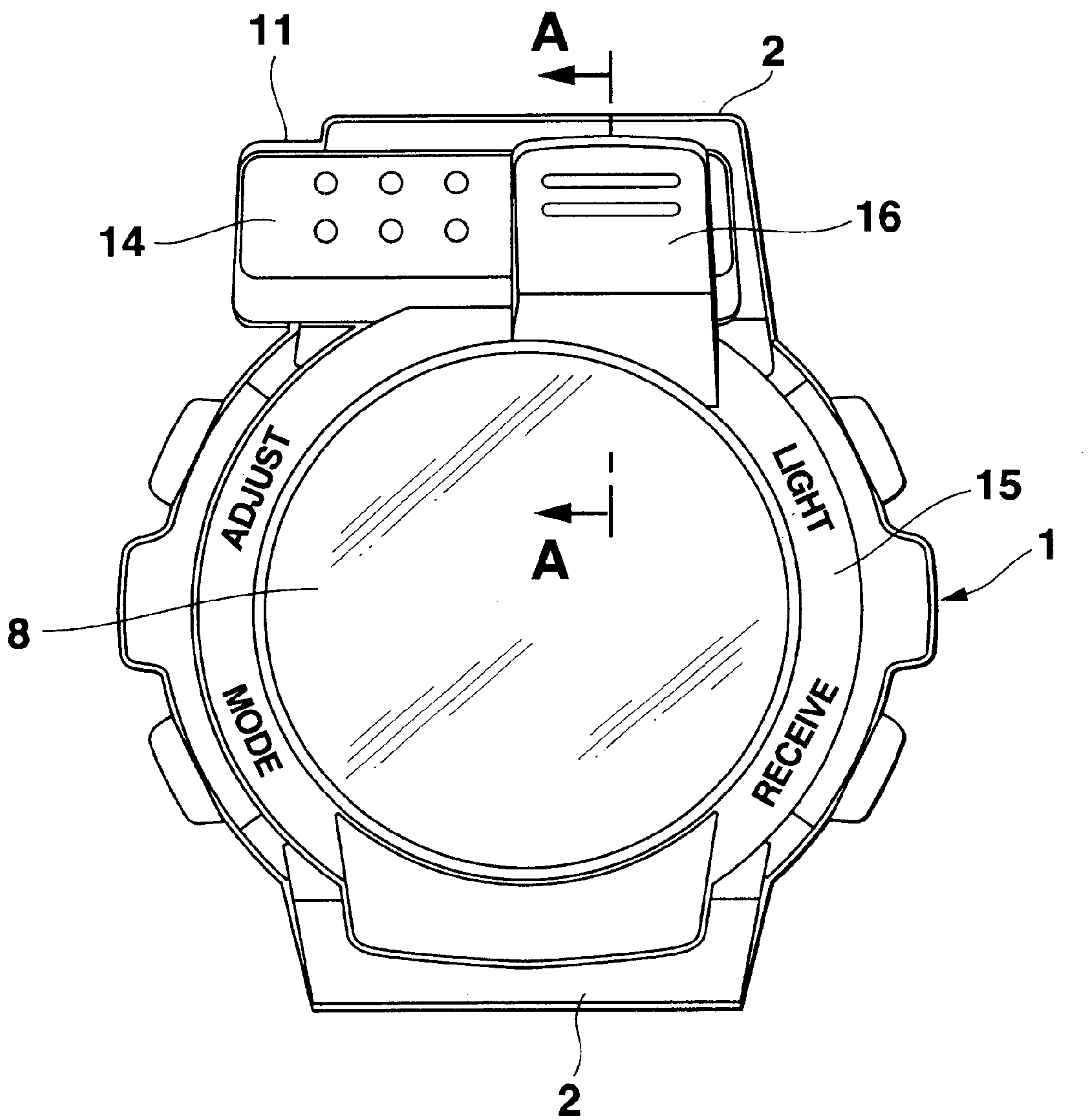
FIG. 1 is a plan view of an electronic watch, according to a first embodiment of the present invention.
Figure 2:
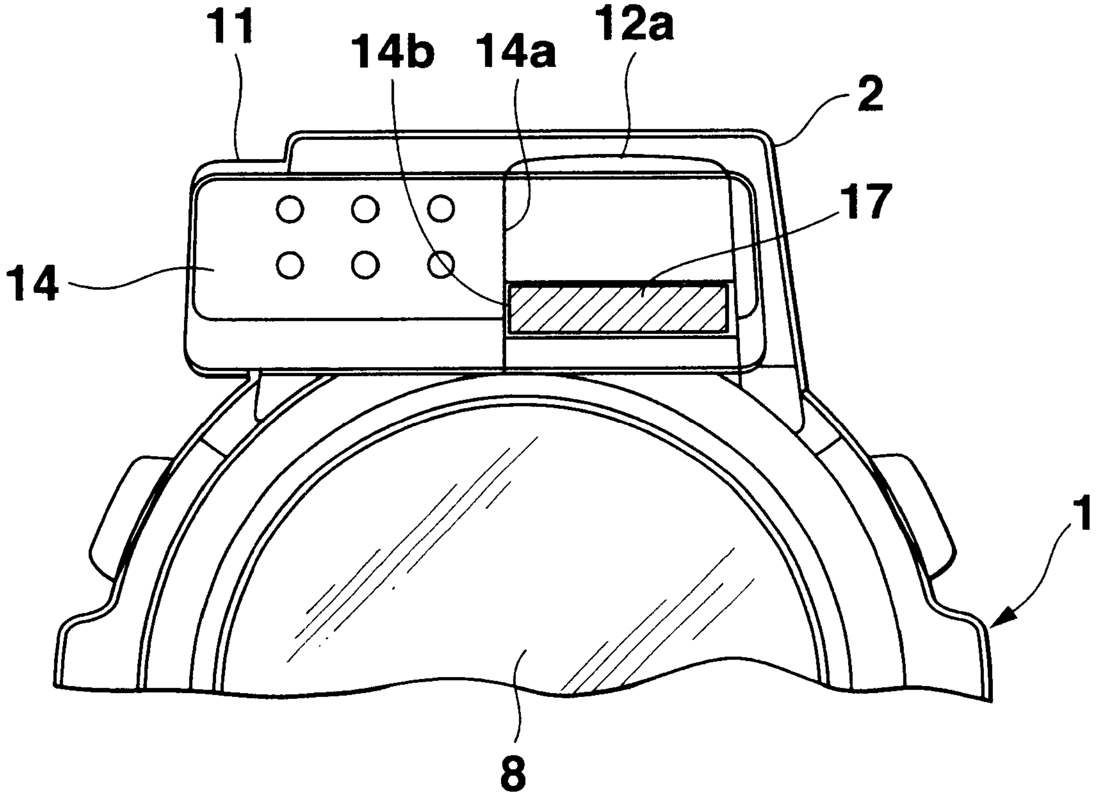
FIG. 2 is a plan view of the main portion of the watch case in FIG. 1, in a state of removing the bezel.
Figure 3:
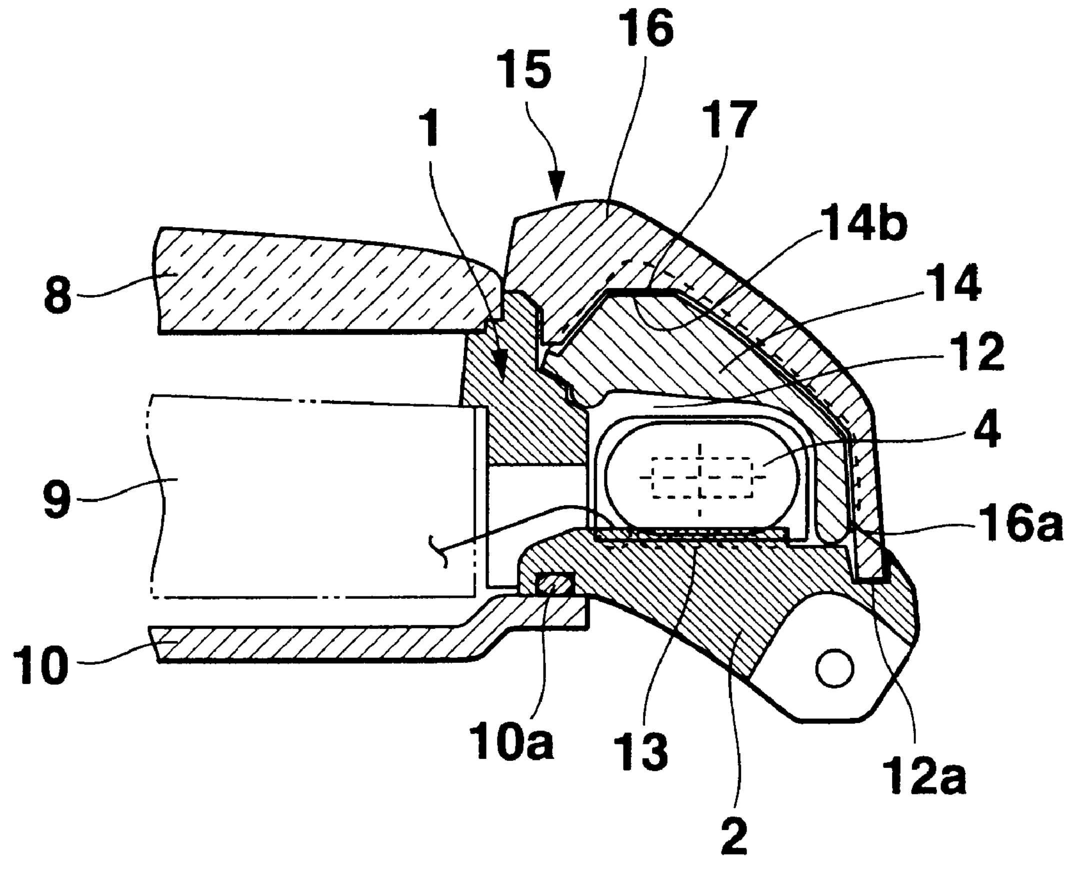
FIG. 3 is an enlarged sectional view taken along the lines A—A of FIG. 1.
Figure 4:
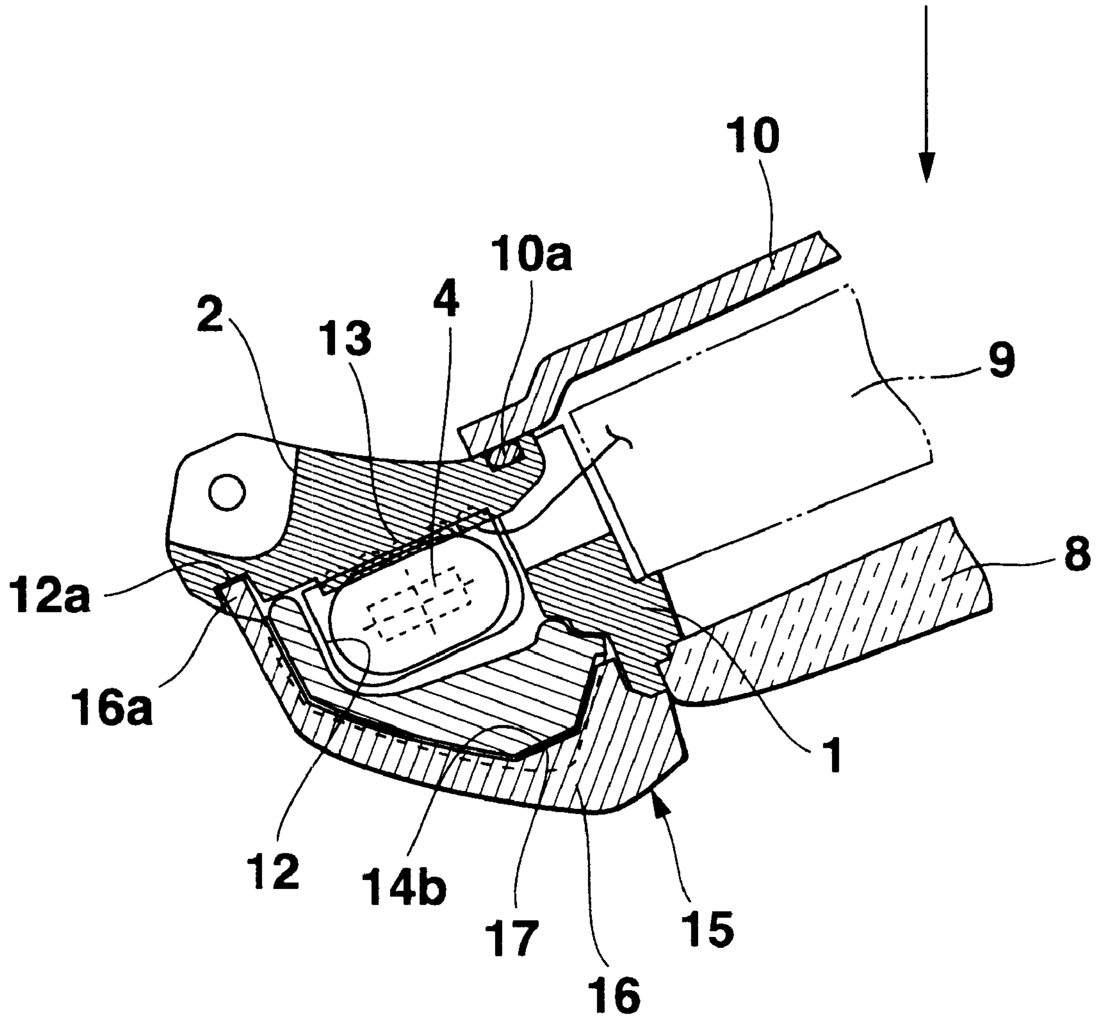
FIG. 4 is an enlarged sectional view showing the state of the main portion of the watch shown in FIG. 3 dropping down.

On the peripheral portion of the upper surface of the watch case 1, a ring-shaped bezel 15 which is a casing member is installed, as shown in FIG. 1. On the bezel 15, a supporting member 16 made of a plastic is formed to project. The supporting member 16 is disposed to cover about a half in a three o'clock direction side, that is, in the right side in FIG. 1, of on the covering member 14. In the upper surface of the covering member 14, a shallow recess portion 14*a* with a shape into which the lower surface of the supporting member 16 fits is formed, as shown in FIG. 2. The supporting member 16 comprises a supporting upper wall portion and a supporting side wall portion, and at least a portion near the watch glass 8 of the supporting upper wall portion has a thickness larger than that of the supporting side wall portion, as shown in FIG. 3. In the periphery of the band connecting portions 2, a fastening recess portion 12*a* which enables receiving the top end 16*a* of the supporting side wall portion of the supporting member 16 therein to perform fastening, is formed. Further, between the supporting member 16 and the covering member 14, a cushion member 17 which is made of a rubber sheet is provided, as shown in FIG. 3. In the most upper surface of the covering member 14 in the shallow recess portion 14*a*, a flat surface 14*b* is formed. The cushion member 17 is placed on and adhered to the flat surface 14*b*. The covering member 14 is held down by the supporting member 16 of the bezel 15 through the cushion member 17, with keeping this state.

In the electronic watch, a portion of the covering member 14 which is fixed to the antenna attachment portion 11 which has the containing concavity 12 containing the antenna 4 therein, that is, approximately the right half of the covering member 14 in FIG. 1, is covered and held down by the supporting member 16 of the ring-shaped bezel 15 which is attached to the periphery of the watch case 1. Therefore, even if the electronic watch is dropped by accident in the state that the side of the watch glass 8 takes a lower position and the watch case 1 rotates so that the antenna 4 takes a lower position because of the large weight of the antenna, the supporting member 16 of the ring-shaped bezel 15 functions as a buffer for the covering member 14 and the antenna 4 contained therein. Accordingly, the covering member 14 can be protected by the supporting member 16 so that the welding portion of the covering member 14 is not cracked nor destroyed.

In the embodiment, because the cushion member 17 is provided between the supporting member 16 and the covering member 14, it is possible to further reduce the impact to the covering member 14, caused by dropping or the like. As a result, it is possible to protect not only the covering member 14 but also the antenna 4 which is contained in the containing concavity 12. Therefore, the electronic watch is different from the conventional technique in that it does not require to wound a cushion member 6 around the antenna 4 in order to protect the antenna 4. As a result, the size of the whole antenna 4 does not get large and accordingly, the containing concavity 12 does not require a large size. As a result, it is possible to make the entirety of the watch small-sized.

Figure 5:
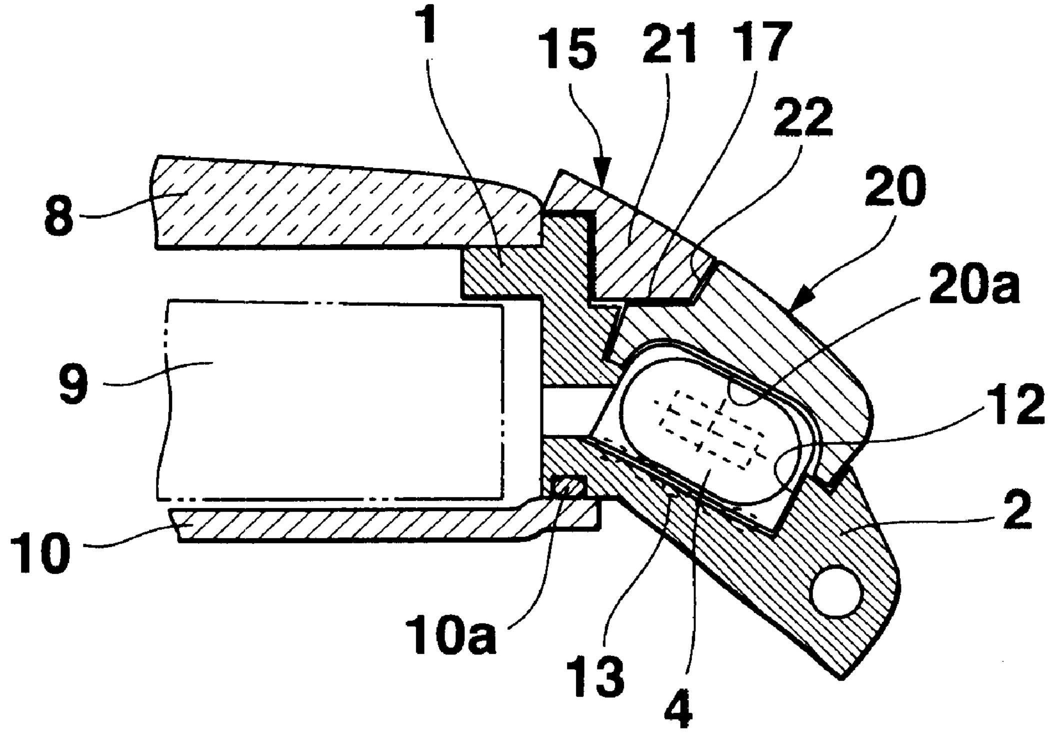
FIG. 5 is an enlarged sectional view of an electronic watch, according to a second embodiment of the present invention.

Next, a second embodiment of the electronic watch according to the invention will be described with reference to FIG. 5. In the figure, the same numbers are attached to structural members, elements or the like corresponding to those of the first embodiment shown in FIGS. 1 to 4.

The electronic watch according to the second embodiment is different from that of the first embodiment in the shapes of a covering member 20 for covering the antenna 4 which is fixed to the antenna attachment portion so as to form the containing concavity 12, and of a supporting member 21 of the bezel 15, for holding down the covering member 20, with covering a portion of the covering member 20. Except such different points, the electronic watch according to the second embodiment has approximately the same elements, material, and structure as those of the first embodiment.

That is, a ring-shaped bezel 15 which is a casing member and is made of a plastic, is installed around the watch glass 8 on the upper surface of the watch case 1. The covering member 20 is made of a plastic panel and has a large thickness approximately entirely. In the lower surface of the covering member 20, a recess portion 20*a* is formed to form a containing concavity 12 which is the space for containing the upper portion of the antenna 4 therein. In the upper surface of the covering member 20 in the side near the watch glass 8, another recess portion 22 is formed for fitting the supporting member 21 of the bezel 15 therein. The supporting member 21 is attached to the bezel 15 at a position in the twelve o'clock side as a body, to project from the periphery of the bezel 15. The supporting member 21 is disposed to fit in the recess portion 22 of the covering member 20 and hold down the covering member 20. Further, between the supporting member 21 of the bezel 15 and the covering member 20, a cushion member 17 which is made of a rubber sheet is provided. In this embodiment, the upper surface of the covering member 20 has a flat surface in the recess portion 22. On the flat surface, the cushion member 17 is adhered. The covering member 20 is held down by the supporting member 21 of the bezel 15 through the cushion member 17, with keeping this state.

In the electronic watch, the recess portion 22 is formed in the upper surface of the covering member 20 which is fixed to the antenna attachment portion 11 which has the containing concavity 12 containing the antenna 4 therein, and the supporting member 21 of the bezel 15 which is installed to the periphery of the watch case 1 is fitted in the recess portion 22 to hold down the covering member 20 from the above. The supporting member 21 undertakes a portion of the impact caused by dropping or the like to some extent, and accordingly, the covering member 20 can be protected by the supporting member 21 so that the welding portion of the covering member 20 is not cracked nor destroyed. In the embodiment, because the cushion member 17 is provided between the supporting member 21 and the covering member 20, in the recess portion 22, it is possible to further reduce the impact to the covering member 20, caused by dropping or the like. As a result, it is possible to protect not only the covering member 20 but also the antenna 4 which is contained in the containing concavity 12. As a result, it is possible to make the entirety of the watch small-sized, like the first embodiment.

What is claimed is:

1. An electronic watch comprising:

a watch case with a containing concavity which is formed in a peripheral portion thereof;

an antenna contained in the containing concavity;

a covering member fixed to the watch case, for covering the containing concavity containing the antenna; and a casing member provided with a supporting member which is attached to a periphery of the watch case to hold down the covering member, covering at least a portion of the covering member.

2. The electronic watch as claimed in claim 1, further comprising a cushion member at a position between the covering member and the supporting member.

3. The electronic watch as claimed in claim 2, wherein the cushion member is made of a rubber sheet.

4. The electronic watch as claimed in claim 1, wherein the electronic watch further comprises a watch glass at a central portion on an upper portion of the watch case, and the casing member has a ring-shape and is arranged to surround the watch glass.

5. The electronic watch as claimed in claim 1, wherein a substantially flat surface is formed on at least a portion of the covering member which is covered with the supporting member.

6. The electronic watch as claimed in claim 5, wherein a cushion member is provided on the flat surface of the covering member and the covering member is held down by the supporting member through the cushion member.

7. The electronic watch as claimed in claim 1, wherein a shallow recess portion with a shape into which the supporting member fits is formed in an upper surface of the covering member.

8. The electronic watch as claimed in claim 1, wherein the covering member comprises an upper wall portion and a side wall portion, and the upper wall portion has a conical shaped section and a thickness larger than that of the side wall portion.

9. The electronic watch as claimed in claim 1, wherein the supporting member comprises a supporting upper wall portion and a supporting side wall portion, and at least a portion of the supporting upper wall portion has a thickness larger than that of the supporting side wall portion.

10. The electronic watch as claimed in claim 9, wherein an fastening recess portion which enables receiving an end of the supporting side wall portion therein to perform fastening, is formed in the watch case.

11. The electronic watch as claimed in claim 1, wherein each of the containing concavity, the antenna, the covering member and the supporting member is disposed at a position in a twelve o'clock side of the watch case.

12. An electronic watch as claimed in claim 11, wherein the supporting member is disposed at a position on the covering member in a three o'clock direction side.

* * * * *